Dec. 23, 1930.  C. E. LEWIS  1,785,741
AIR CONDITIONING SYSTEM
Filed July 29, 1929   2 Sheets-Sheet 1
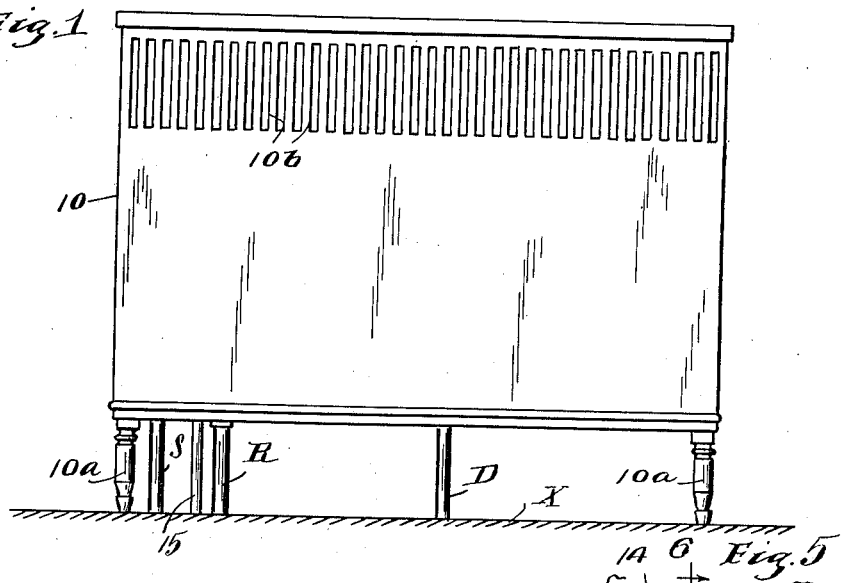
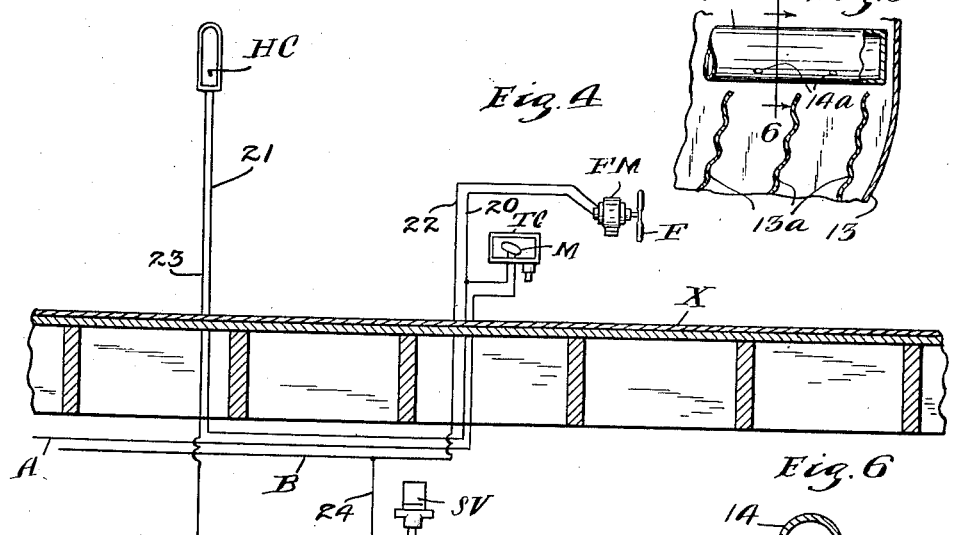
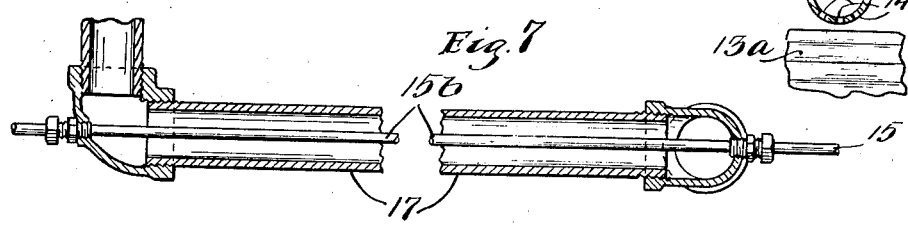
INVENTOR.
CARROLL E. LEWIS.
BY HIS ATTORNEYS.

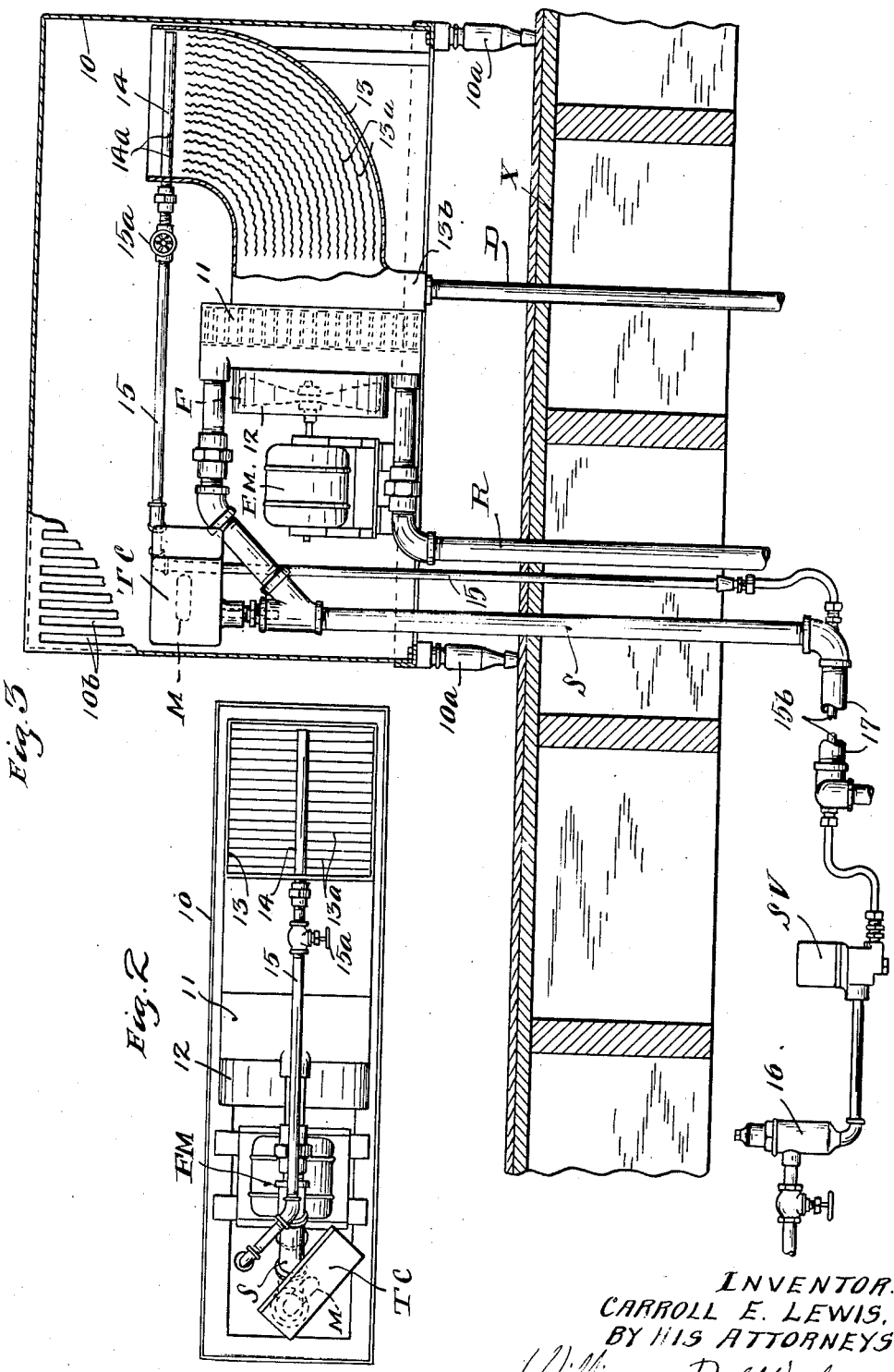

Patented Dec. 23, 1930

1,785,741

UNITED STATES PATENT OFFICE

CARROLL E. LEWIS, OF ST. PAUL, MINNESOTA, ASSIGNOR TO THE LEWIS CORPORATION, INC., OF MINNEAPOLIS, MINNESOTA, A CORPORATION OF NEW MEXICO

AIR-CONDITIONING SYSTEM

Application filed July 29, 1929. Serial No. 381,905.

This invention relates to an air conditioning system and apparatus for humidifying, thermally treating and purifying the air in a room or building.

The invention is an improvement on the apparatus and system disclosed in my copending application for U. S. Letters Patent entitled "Humidifier and heater", S. N. 261,576, filed March 14th, 1928.

In my said prior application I disclosed an efficient system and apparatus wherein a column of air was caused by a fan to pass through a radiator and then through a highly efficient humidifying device to heat and humidify said air, accelerate the circulation of air in a room or building and also cleanse or purify the air. The system, as disclosed, also included a thermally controlled regulator for the fan and an independent humidity actuated regulator to control the supply of liquid to the humidifying device. The radiator was connected with the circulating heating system for heating a building.

Under normal conditions with the circulating heating system for the building functioning properly, my earlier apparatus functioned in a highly efficient manner. However, if the temperature of the circulating medium in the heating system dropped below a predetermined point, the air passing through the unit heater would not attain a temperature sufficient to effectively evaporate the water or liquid delivered to the humidifier and to also supply requisite heat for maintaining the temperature of the room or building as desired. This, of course, impaired the efficiency of the device for adequately heating the building, wasted a considerable amount of fluid, and occasionally caused particles of unevaporated liquid to be delivered with the treated air.

It is an object of my present invention to obviate the objectionable features above noted and to provide an air conditioning system for maintaining the air of a room or building as nearly as possible at a substantially constant temperature and with a substantially constant degree of humidity.

It is a further object to provide an air conditioning system of the class above described wherein the control mechanisms for the temperature and humidity of the air delivered to the building are so connected and related that the humidity controlling means will not be rendered operative until the radiator or a heating medium has attained a predetermined temperature requisite to adequately heat a column of air subjected thereto for evaporating the requisite amount of liquid and for also heating the air delivered to the room.

More specifically it is an object to provide in an air conditioning system of the class previously referred to, an electro-magnetically operated valve for controlling the supply of liquid to the humidifier, and electrical temperature controlling and humidity controlling circuits, so related and connected that the humidity controlling circuit cannot be closed until the temperature of the heating medium or fluid in the radiator has reached a predetermined value.

A further object is to provide a system and an apparatus for conditioning air wherein a heating medium is used to increase the evaporative capacity as well as heat the air passing through a humidifier, and wherein means are associated with the supply conduit for the radiator for tempering or pre-heating the water or other liquid evaporated in said humidifier.

These and other objects and advantages of the invention will be fully set forth in the following description made in connection with the accompanying drawings wherein like reference characters refer to similar parts throughout the several views and in which, Fig. 1 is a front elevation of the air conditioning device proper, enclosed in an ornamental casing;

Fig. 2 is a top plan view of the same with the cover of the casing removed;

Fig. 3 is a vertical section through the ornamental casing and the floor of a building, in which an embodiment of my invention is mounted, showing most of my apparatus in side elevation, some portions, however, being broken away and others shown in section;

Fig. 4 is an electrical diagram showing the humidity and temperature controlling circuits and the inter-relation of the controlling mechanisms;

Fig. 5 is a fragmentary vertical section showing the manner in which liquid is dispensed upon the evaporating plates of the humidifier;

Fig. 6 is a cross section taken on the line 6—6 of Fig. 5;

Fig. 7 is a view in vertical section showing my apparatus for tempering or preheating the liquid supplied to the humidifier.

In many respects the apparatus of my improved system is similar to the apparatus disclosed in my heretofore identified copending application. As illustrated in the drawings, an embodiment of my air conditioner proper is supported upon the floor X of a building enclosed or concealed by means of a rectangular ornamental casing 10, which preferably has an open bottom and is supported somewhat above the level of the floor by suitable legs 10a. The upper portion of the forward wall of casing 10 may be provided with a series of delivery openings 10b arranged in the form of a grating.

Within the central and lower portion of casing 10 a radiator 11 or other heating medium is suitably mounted and I prefer to employ a radiator of the type utilized in unit heaters, said radiator being disposed in upright position and having the upper tank thereof connected with the supply pipe S of a steam, hot water or vapor heating system for a building and the lower tank thereof connected with the return pipe R of said heating system. A fan casing 12 is mounted at one end of radiator 11 and a suitable fan F is mounted in casing 12 and is driven by a fan motor F. M. which is suitably mounted in the lower portion of ornamental casing 10.

An arcuate or segmental evaporating flue 13 is secured to the opposite or air delivery side of radiator 11 and its lower and horizontal end abuts said radiator while its upper or delivery end is directed toward the top of casing 10. Evaporating flue 13 is provided with a series of spaced evaporating plates 13a extending concentrically of flue 13 and terminating short of radiator R in order that they all may deliver to a drain trough 13b in the lower portion of flue 13. Evaporating plates 13a are each provided with a series of relatively shallow transverse corrugations to evenly distribute the water or liquid upon said plates and to cause said water to travel over said plates in the form of a film. Water or liquid is distributed upon plates 13a by means of a horizontal conduit 14 disposed above the upper ends of said plates, said conduit being provided, as clearly shown in Figs. 3, 5 and 6 with a series of discharge ports 14a, three radially arranged discharge ports being provided for each plate of the humidifier. Delivery conduit 14 is connected with the liquid supply pipe 15 and a suitable hand valve 15a may be provided if desired adjacent the evaporating flue 13. As illustrated, a strainer 16 is provided in the water supply pipe and also a solenoid or electromagnetically operated valve S. V., said valve, as shown, being disposed below the floor X. Adjacent the delivery side of solenoid valve S.V. the water supply pipe is provided with a straight diminished section 15b, which passes through a straight section 17 of the circulating fluid supply pipe S (see Figs. 3 and 7). Liquid passing through the section 15b of the water supply pipe is pre-heated or tempered by contact with the hot fluid in the heating system and is delivered in heated condition to the upper ends of the evaporating plates.

The supply pipe of the heating system has a vertical portion which connects at its upper end with the upper tank of radiator 11 and a suitable thermostatic control mechanism T. C. is connected or associated with the upper end of said vertical section of pipe S, as shown, comprising a mercury tube, thermostatically operated switch, the mercury tube being indicated in dotted lines in Fig. 3 by the letter M. The particular thermostat utilized is of the tap, bellows type, but it will, of course, be understood that any suitable thermostat operated switch may be provided for the control mechanism T. C. which may be subjected to the circulating heating fluid passing through supply pipe S into radiator 11.

Control mechanism T. C. is primarily for the purpose of controlling the circuit through the fan motor F. M. and thereby regulating the temperature and rapidity of circulation of air through radiator 11 into a room or building. However, as will later be more fully brought out, temperature control mechanism T. C. has another important function in that it acts as a master switch to render operative or inoperative the control mechanism for varying the amount of water or liquid delivered to the evaporating plates 13a and thereby the degree of humidity of the delivered air.

At a convenient point in the room or building wherein my apparatus is mounted, I provide a humidity control mechanism H. C. which may be of any suitable type such as the mechanism disclosed in my co-pending application entitled "Humidity control", S. N. 281,722, filed May 31st, 1928, wherein the expansion and contraction of an absorbent member through highly sensitive connections operates a mercury tube switch for controlling the opening and closing of a solenoid valve in the liquid supply pipe.

In Fig. 4 the electrical circuits and the inter-relation of the humidity control, temperature control, the fan and the solenoid valve are illustrated. It will be seen that the supply conductor A from the line connects with one of the terminals of the mercury tube M of temperature control T. C. while the opposite terminal of the temperature control is connected with one of the terminals of the fan motor F. M. by a wire 20 and also with one of the terminals of the humidity control H. C. by a wire 21. The output side of the fan motor is connected by a wire 22 to the return conductor B of the line and the output terminal of the humidity control H. C. is connected by a wire 23 with one of the terminals of the solenoid valve S. V., the opposite terminal of said valve being connected by a wire 24 with the return conductor B of the line.

It will thus be seen that whenever mercury tube switch M is in a predetermined position the circuit through the fan motor will be closed, the fan will operate, accelerating the circulation of air through the radiator or heating medium and consequently more heat will be delivered in the room. It will also be seen that until the circuit through the temperature control is closed the humidity control will be inoperative. When the humidity actuated switch in control H. C. is closed and the temperature control circuit is also closed solenoid valve S. V. will be opened, causing the delivery of water or liquid upon the upper ends of the evaporating plates. The temperature control is so adjusted that the switch M will not close its circuit until the temperature of the heating fluid entering radiator 11 is sufficiently high to cause evaporation of the liquid passing over plates 13$a$ as well as to adequately heat the air, the cooling effect from said evaporation being taken into consideration.

In order that an efficient evaporation may be effected without undue chilling of the air delivered at the upper end of the flue 13, I have found it highly desirable to pre-heat or temper the water or liquid delivered to the evaporating plates. The relation of the liquid supply pipe, heating fluid supply pipe and other elements of my apparatus makes this conveniently possible. By reducing the liquid supply pipe 15 through a section thereof, 15$b$, and passing said section through the axis of a portion of the supply pipe S this is accomplished, and as a result, and due to the functioning of my humidity control and temperature control mechanisms, the maximum amount of liquid is evaporated and only a relatively small amount wasted. Unevaporated moisture which drops from the lower ends of the several plates 13$a$ is collected in the drain trough 13$b$ and discharged through a drain pipe D.

From the foregoing description it will be seen that I have invented a new and improved air conditioning system, which is quickly responsive to changes in the temperature and humidity of the air in a room or building and which as nearly as possible will maintain the temperature and air in said room or building at constant values.

Evaporation of water or liquid cannot take place until the temperature of the circulating fluid in the heating system is sufficient to effect the requisite heating and humidity of the air circulated into a room or building. Water wastage is minimized and there is absolutely no possibility of delivering to a room unevaporated particles of moisture.

The device may be converted into a cooling system for hot weather use by connecting the upper tank of radiator 11 with the supply pipe of a circulating refrigerant.

It will, of course, be understood that various changes may be made in the form, details, arrangement and proportions of the parts without departing from the scope of applicant's invention.

What is claimed is:

1. In an air conditioning system, a device for controlling delivery of liquid to a humidifier, a humidity actuated regulator, connections between said regulator and said delivery control device, a heating medium, a thermally actuated regulator subjected to said heating medium and connections between said last mentioned regulator and said humidity actuated regulator to render said humidity regulator operative.

2. In an air conditioning system, a device for controlling the delivery of liquid to a humidifier, a humidity actuated regulator for controlling said device, a heating medium for facilitating the evaporation of said liquid, a device for varying the effect of said heating medium upon the air, a thermally actuated regulator subjected to said heating medium and adapted to control said last mentioned device, and connections between said thermally actuated regulator and said humidity actuated regulator to render said humidity regulator operative.

3. In an air conditioning system, a device for varying the supply of liquid to a humidifier, a humidity actuated regulator and an electrical circuit between said regulator and said device for operating said device, a heating medium constituting an element of said humidifier, an electrically driven device for varying the effect of said heating medium upon the air, a thermally actuated regulator subjected to said heating medium, an electrical circuit including said last mentioned regulator and said heat varying device, and means in said first mentioned circuit for rendering said humidity actuated regulator operative.

4. In an air conditioning system, a humidifier including an evaporating chamber, a liquid supply pipe, an electrically operated valve for varying the supply of liquid from said supply pipe to said evaporating chamber, a radiator associated with said evaporating chamber and connected with a source of heating fluid, an electrically driven fan for causing air to travel through said radiator and through said evaporating chamber, a thermally actuated regulator in electrical circuit with said fan, and subjected to said heating fluid adjacent said radiator, a humidity actuated regulator in circuit with said electrically operated valve, said thermally actuated regulator including a switch for closing said fan circuit and for also closing said valve circuit to render said humidity regulator operative.

5. In an air conditioning system, a humidifier including an evaporating chamber, a radiator associated with said evaporating chamber and connected with a source of circulating heating fluid, a fan for causing air to travel through said radiator and through said evaporating chamber, a thermally actuated regulator subjected to said heating fluid adjacent said radiator, and connections between said regulator and said fan for controlling the circulation of air through said radiator and evaporating chamber.

6. In an air conditioning system, a humidifier, including an evaporating chamber, a heating medium associated with said evaporating chamber, an electrically driven fan for causing air to travel through said heating medium and through said evaporating chamber, a thermally actuated regulator in electrical circuit with said fan and subjected to said heating medium for controlling the circulation of air through said heating medium and evaporating chamber.

In testimony whereof I affix my signature.

CARROLL E. LEWIS.